UNITED STATES PATENT OFFICE.

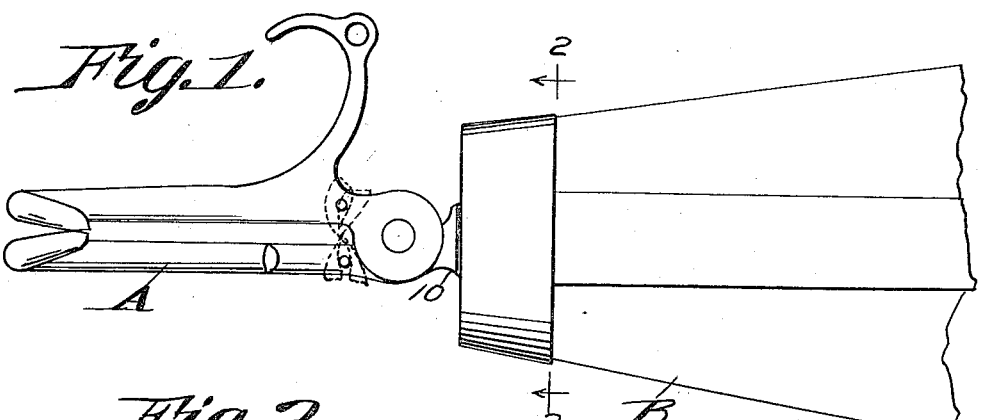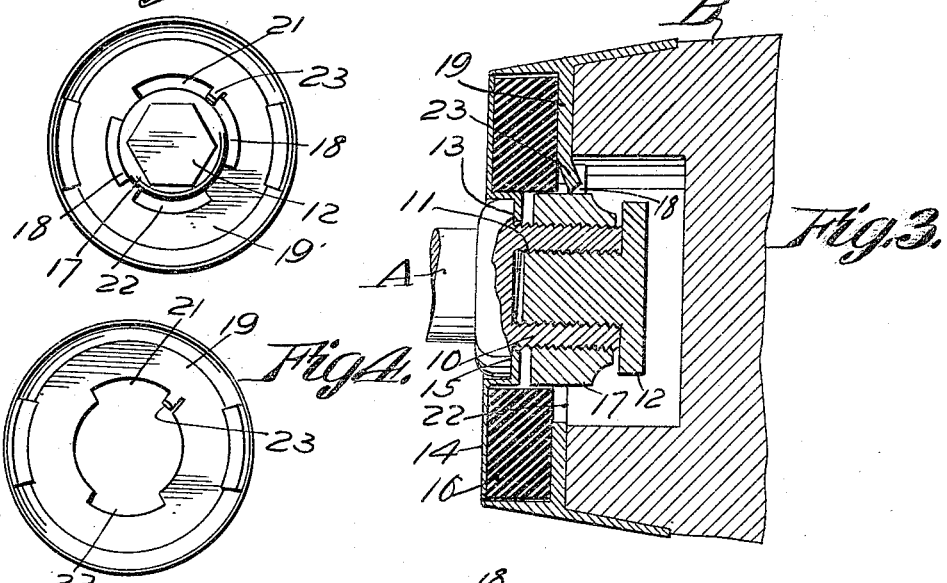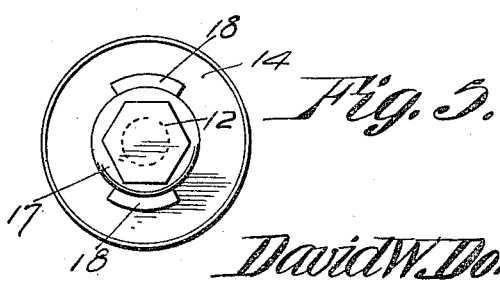

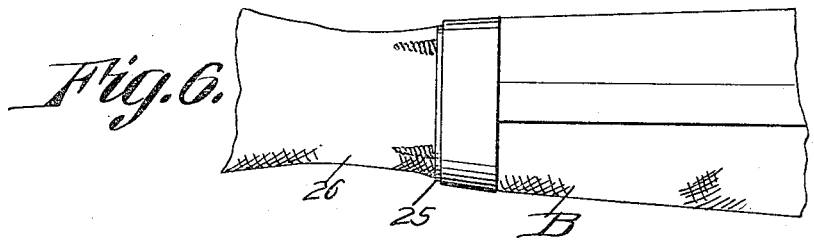
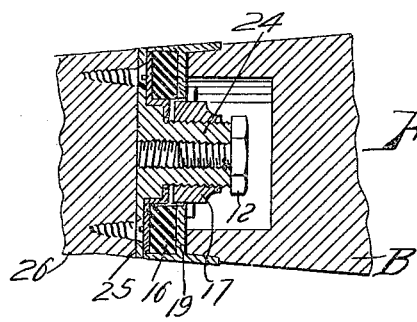
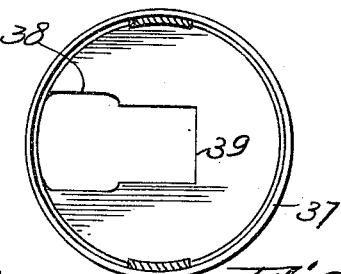
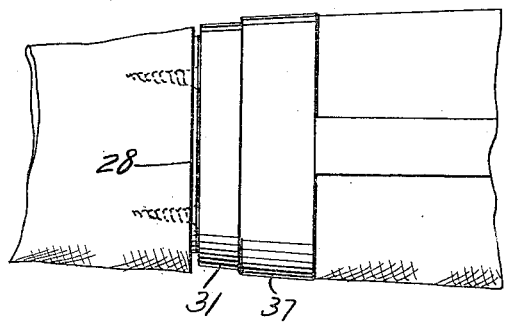
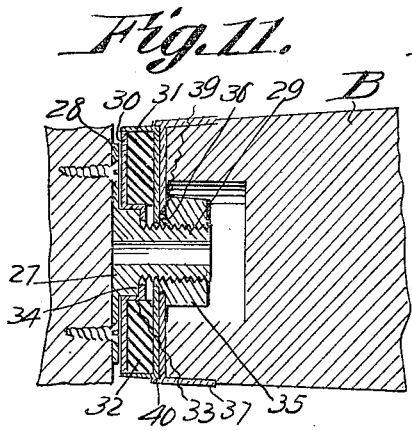
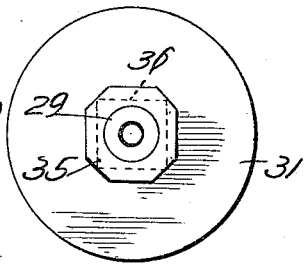

DAVID W. DORRANCE, OF SAN JOSE, CALIFORNIA.

ARTIFICIAL-LIMB JOINT.

1,271,448.

Specification of Letters Patent.  Patented July 2, 1918.

Application filed November 11, 1916. Serial No. 130,739.

*To all whom it may concern:*

Be it known that I, DAVID W. DORRANCE, a citizen of the United States, residing at San Jose, in the county of Santa Clara and State of California, have invented certain useful Improvements in Artificial - Limb Joints, of which the following is a specification, reference being had therein to the accompanying drawing.

The invention relates to an artificial limb joint, and more particularly to the class of self-locking detachable wrist connectors or couplings for use with artificial limbs or the like.

The primary object of the invention is the provision of a connector or coupling of this character wherein the employment of latches or the like is eliminated in the fastening of the artificial hand, hook or the equivalent to the arm part of an artificial member, and said hand, hook or the equivalent can be readily and easily attached or detached with despatch at the will of the user.

Another object of the invention is the provision of a connector or coupling of this character wherein the male and female members thereof are novel in form to assure a rigid and relatively fixed joint between the parts so that such joint will not accidentally separate, yet the parts can be readily disassembled when the occasion requires without necessitating the releasing of a latch, spring or other like holding element, which latter are dispensed with, thereby simplifying the connector or coupling and rendering the same more compact and effective in its use.

A further object of the invention is the provision of a connector or coupling of this character wherein the user can separate the same to allow the interchanging of the artificial member, namely, a hand, for a hook or vice versa, and when attached will be firm, rigid and positive in its purpose.

A still further object of the invention is the provision of a connector or coupling of this character which is least susceptible to wear and, when worn, can be repaired at a minimum expense and expeditiously.

A still further object of the invention is the provision of a connector or coupling of this character which is extremely simple in its construction, possessing few parts, which are readily separable from each other, strong, durable, thoroughly reliable and efficient in its operation and purpose and inexpensive in manufacture and installation.

A still further object of the invention is the provision of a connector or coupling of this character wherein the utility hook, limb, or its equivalent, can be readily adjusted by the turning thereof so as to position the said hook or hand for the convenience of the user thereof in manipulating the hook, hand or its equivalent, and in the adjustment of the connector or coupling either several turns or a half turn can be effected for the secure fastening of the parts thereof to assure the requisite frictional binding of said parts to hold the hand, utility hook or its equivalent in the position desired.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claims.

In the accompanying drawings:

Figure 1 is an elevation of a coupling constructed in accordance with the invention;

Fig. 2 is a sectional view on the line 2—2 of Fig. 1, looking in the direction of the arrows;

Fig. 3 is a vertical longitudinal sectional view through the coupling;

Fig. 4 is a plan view showing the female member separated;

Fig. 5 is a plan view of the male member;

Fig. 6 is a fragmentary elevation showing a slight modification of the invention;

Fig. 7 is a vertical longitudinal sectional view therethrough;

Fig. 8 is a side elevation of a still further modification of the invention;

Fig. 9 is a plan view of the female member;

Fig. 10 is a plan view of the male member;

Fig. 11 is a vertical longitudinal sectional view showing the male and female members connected together.

Similar reference characters indicate corresponding parts throughout the several views of the drawings.

Referring to the drawings in detail, particularly Figs. 1 to 5, inclusive, A designates generally a utility hook which is a substitute for an artificial hand and B the wrist part which is carried by the fore-arm and fastened thereto in any suitable manner, the hook A being separable from said wrist part in a manner presently described.

The connector or coupling comprises male and female members which detachably connect the hook and wrist part together, the male member including an externally threaded stud or lug 10 which, in this instance, is integrally formed with the hook A and is provided with a central threaded socket 11 in which is detachably received a headed bolt 12, while loosely surrounding the stud or lug 10, concentrically of an annular shoulder 13 thereon, is a base disk 14 provided with a bearing flange 15 which engages and rests upon the shoulder 13. Supported by the base disk 14 is a resilient washer or gasket 16, preferably made from rubber and of any thickness desired.

Adjustable upon the threaded stud or lug 10 is a lock nut 17 which, at diametrically opposite points, is formed with the segment shaped wings 18 for the locking of the nut 17 in the female member hereinafter fully described.

The female member comprises a locking web 19 which is of annular formation and is integral with the wrist part B internally thereof, the web 19 being inset from the outer end of the collar 20 of said wrist part so as to form a pocket within the latter for the reception of the washer or gasket 16 on the joining of the hook A with the wrist part B with the connector or coupling.

The web 19 is formed at diametrically opposite points in the inner periphery thereof with notches 21 and 22, respectively, which are correspondingly shaped to the wings 18 for receiving the same so that said wings will lock with the web 19 for the joining of the wrist part to the hook.

The notch 22 in the web 19 is of greater size than the notch 21 therein and has protruding from its edge, at one corner thereof, an abutment nib or tongue 23 which is bent inwardly at an angle to the plane of the web 19 and is adapted to engage with either of the wings 18 for the automatic turning of the nut 17 to loosen or tighten the same by the turning thereof upon the stud or lug 10 so that the wings 18, when tightening the nut, will ride on to the web 19 after passing through the notches 21 and 22 therein to positively lock with the said web and thereby fasten the male member to the female member of the connector or coupling, the resilient washer or gasket 16 being compressed between the base disk 14 and the said web 19 so that the hook A will be firmly and rigidly fastened to the wrist part B. When it is desired to detach the hook A the same is rotated in a reverse direction so that the nib or tongue 23 will engage with one of the wings 18 and thus screw the nut outwardly on the stud or lug 10 so that the said wings 18 will be brought into registration with the notches 21 to disengage the male member from the female member and thereby separate the hook A from the wrist part B, as will be clearly obvious.

The wrist part B is mounted on the forearm of the user in any desirable manner.

In Figs. 6 and 7 there is shown a slight modification of the invention, wherein the stud or lug 24 is formed centrally on an attaching base or disk 25, the latter being adaptable for fastening to the stub portion 26 of an artificial hand of the solid or other type.

In Figs. 8 to 11, inclusive, there is shown a still further modification of the invention, wherein the lug 27 with its base 28 is carried by the stud 29 which is a part of the artificial limb, and loosely surrounding the lug 27 are the interfitting parts 30 and 31 of a casing in which is arranged a resilient washer or gasket 32, the part 30 being formed with a central counter-seat 33 for a shoulder 34 formed on the base 28 concentrically of the stud 29 and said shoulder constitutes a rest for the casing.

Threaded on the stud 29 is a lock nut 35 formed with a squared inner end 36 for the locking engagement thereof with the female member which comprises a cup shaped part 37 adapted to be fastened in any suitable manner to the stub of one part of the artificial limb, and this cup shaped part 37 is formed with a substantially key-hole shaped slot including the wider portion 38 and the narrower squared portion 39, the squared portion being designed to receive the squared end 36, which is correspondingly shaped thereto, when the nut 35 has passed through the wider portion 38 for connecting the male member with the female member. When the squared end 36 of the nut engages in the squared portion of the slot, on the turning of the female member, the nut will be adjusted on the stud 29 so as to have the part 37 frictionally play upon the casing which includes the parts 30 and 31 with the gasket 32 therebetween, thus securely locking the male and female members together.

The female part 37 is formed with a counter-sink 40 which receives the casing including the parts 30 and 31 so that when the male and female members have been tightened and locked together the said female member cannot become displaced laterally for the accidental separation of the male and female members.

The compression of the gasket 32 between the parts 30 and 31 assures a firm frictional hold between the male and female members so as to avoid the accidental separation thereof or turning of the parts relative to each other, yet said male and female members can be readily separated or detached from each other.

A salient feature of the connector or coupling lies in the fact that the utility hook, hand or its equivalent can be readily turned for the proper positioning thereof, whereby the user can manipulate it in the execution of work in a convenient manner and the parts of the connector or coupling can be firmly fastened together by several turns of one of its parts relative to the other or by a single half turn thereof. It is obvious that the members of the connector or coupling are locked together and firmly held without the use of any separate fastenings or the employment of latches, springs, push buttons or other like parts or their equivalent.

It will be apparent that the resilient washer or gasket acts as a binding medium to hold the male and female members when locked together, and in event of wear of said resilient washer or gasket a new one can be substituted or filling washers or the like applied. Furthermore, should the connector or coupling require repairing or the replacing of new parts the construction thereof permits this to be done with despatch, as the parts can be readily disassembled and assembled when the occasion requires.

Now it is to be understood that the forms of connectors or couplings hereinbefore described are especially designed for use with artificial limbs, although it is to be understood that said connectors or couplings can be used in any other manner and for other purposes.

From the foregoing description, taken in connection with the accompanying drawings, the construction and operation of the herein described artificial limb joint will be readily understood and, therefore, a more extended explanation has been omitted.

Having thus described my invention, I claim:

1. A coupling of the character described comprising separable male and female members, said male member having a stud, a resilient gasket loose on the stud, means for supporting the gasket, and a locking member adjustable on the stud, said female member including a web for locking engagement with the locking member and movable thereby into binding action therewith by the gasket.

2. A coupling of the character described comprising separable male and female members, said male member having a stud, a resilient gasket loose on the stud, means for supporting the gasket, a locking member adjustable on the stud, said female member including a web for locking engagement with the locking member and movable thereby into binding action therewith by the gasket, and means on the stud for limiting the movement of the locking member in one direction.

3. In a separable coupling, a male member, a female member, means for locking the members together and operated upon by said female member, and resilient means for binding the male and female members together when locked with each other.

4. In a separable coupling, a male member, a female member, means for locking the members together and operated upon by said female member, resilient means for binding the male and female members together when locked with each other, and means for limiting the movement of the locking member when moved to releasing position.

5. In a separable coupling, a male member, a female member, means for locking the members together and operated upon by said female member, resilient means for binding the male and female members together when locked with each other, means for limiting the movement of the locking member when moved to releasing position, and a support on the male member for the resilient means.

6. In a separable coupling, a male member, a female member, means for locking the members together and operated upon by said female member, resilient means for binding the male and female members together when locked with each other, means for limiting the movement of the locking member when moved to releasing position, and a support on the male member for the resilient means, said locking means being in the form of a nut having wings, said female member having a web provided with notches for receiving the wings.

7. In a separable coupling, a male member, a female member, means for locking the members together and operated upon by said female member, resilient means for binding the male and female members together when locked with each other, means for limiting the movement of the locking member when moved to releasing position, a support on the male member for the resilient means, said locking means being in the form of a nut having wings, said female member having a web provided with notches for receiving the wings, and means on the web to act upon the wings for moving the nut to locking or unlocking position and its wings into and out of registration with said notches.

8. In a separable coupling, a male member, a female member, means for locking the members together and operated upon by said female member, resilient means for bindng the male and female members together when locked with each other, means for limiting the movement of the locking member when moved to releasing position, a support on the male member for the resilient means, said locking means being in the form of a nut having wings, said female member having a web provided with notches for receiving the wings, means on the web to act upon the wings for moving the nut to locking or unlocking position and its wings into and out of registration with said notches, and means for attaching the female member to a part.

9. A coupling of the character described comprising separable parts, means for the engagement of one of the parts with the other, means for binding the parts together on the engagement of the same with each other, and means for detachably locking said parts and acted upon by one of the same to move it to locking and unlocking positions.

10. A coupling of the character described comprising separable parts, means for binding the parts together when locked, means for detachably locking said parts and acted upon by one of the same to move it to locking and unlocking positions, means for limiting the locking means in its movement in one direction, and a bearing for the binding means.

In testimony whereof I affix my signature.

DAVID W. DORRANCE.

Copies of this patent may be obtained for five cents each, by addressing the "Commissioner of Patents, Washington, D. C."